UNITED STATES PATENT OFFICE.

CARL OSKAR MÜLLER, OF HÖCHST-ON-THE-MAIN, GERMANY, ASSIGNOR TO FARB-WERKE VORM. MEISTER LUCIUS & BRÜNING, OF HÖCHST-ON-THE-MAIN, GERMANY, A CORPORATION OF GERMANY.

AZO DYE AND PROCESS OF MAKING SAME.

941,088.  Specification of Letters Patent.  Patented Nov. 23, 1909.

No Drawing.  Application filed March 1, 1909.  Serial No. 480,651.

*To all whom it may concern:*

Be it known that I, CARL OSKAR MÜLLER, a citizen of the Empire of Germany, residing at Höchst-on-the-Main, Germany, have invented certain new and useful Improvements in the Manufacture of New Dyestuffs, of which the following is a specification.

I have found that by combining diazotized mononitro-benzoylated diamins of the general formula:

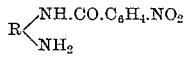

with 2.5.7-aminonaphtholsulfonic acid or a derivative thereof in which substitution has occurred in the amino group, and by treating the coloring matters thus formed with reducing agents suitable for transforming the nitro groups into the amino groups, substantive dyestuffs are obtained which can be diazotized on the fiber and combined with phenols or amins.

Example I: 25 kg. of p-nitrobenzoyl-p-phenylenediamin of the formula:

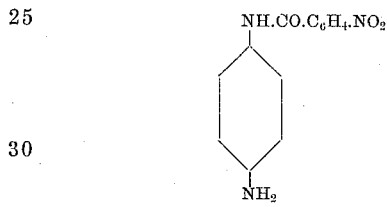

are converted in known manner into the diazo compound and then combined with 33 kg. of acetyl-2.5.7-aminonaphtholsulfonic acid in solution alkaline with sodium carbonate. The formation of the dyestuff is terminated after 24 hours. To this, 50 kg. of crystallized sodium sulfid are added and the mixture is heated for about 2½ hours to 60° C. until all the nitro-dyestuff has disappeared. The dyestuff which separates is filtered off and dried. It dyes unmordanted cotton bluish-red tints which by diazotization on the fiber and combination with beta-naphthol, become faster to washing.

Example II: 25.7 kg. of p-nitrobenzoyl-m-phenylene-diamin are heated in about 200 liters of water and 72 kg. of hydrochloric acid of 30% strength, for about 3 hours, to 60° and well stirred. After having cooled to 10°, a solution of 8 kg. of nitrite is allowed to run into about 20 liters and this mixture is then stirred for about 1½ hours until no unchanged base can be traced any more. The diazo compound thus formed is filtered and run into a solution of 40 kg. of p-nitrobenzoyl-2.5.7-aminonaphtholsulfonic acid and 60 kg. of sodium carbonate in about 2000 liters of water. Thereupon the mass is stirred for 24 hours at 20°, heated to 55° and then 100 kg. of crystallized $NH_2S$ added to it. The stirring is continued for about 2 hours at 55-60° when the formation of the dyestuff is terminated. The dyestuff is then filtered off, pressed and dried. It dyes unmordanted cotton yellowish-red tints, while its developments by means of beta-naphthol also give yellowish-red tints.

Having now described my invention what I claim is:

1. The herein described process for manufacturing red dyestuffs of the general formula:

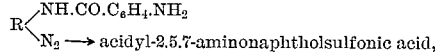

wherein "R" means an aryl residue,—by combining diazotized mono-nitrobenzoylated diamins with acidylated 2.5.7-aminonaphtholsulfonic acids and reducing the nitro-group.

2. The herein described process for manufacturing red dyestuffs of the formula:

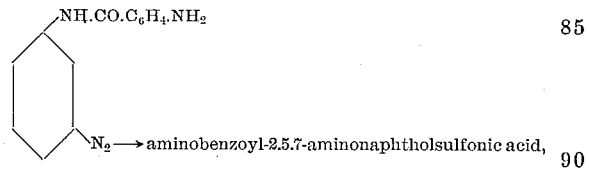

by combining mono-nitrobenzoylated meta-phenylenediamin with nitroarylacidyl-2.5.7-aminonaphtholsulfonic acids and reducing the nitro-group.

3. As new products, the dyestuffs of the general formula:
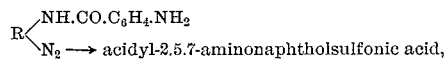
being green powders with a metallic luster, which are soluble in hot water with a red color, dyeing cotton red tints and giving, when treated with beta-naphthol, red dyeings.
In testimony whereof, I affix my signature in presence of two witnesses.
CARL OSKAR MÜLLER.
Witnesses:
JEAN GRUND,
CARL GRUND.